July 10, 1962 — M. I. TAYLOR — 3,043,538
POWER PLANT FOR USE IN JET SUSTAINED AIRCRAFT
Filed April 3, 1961
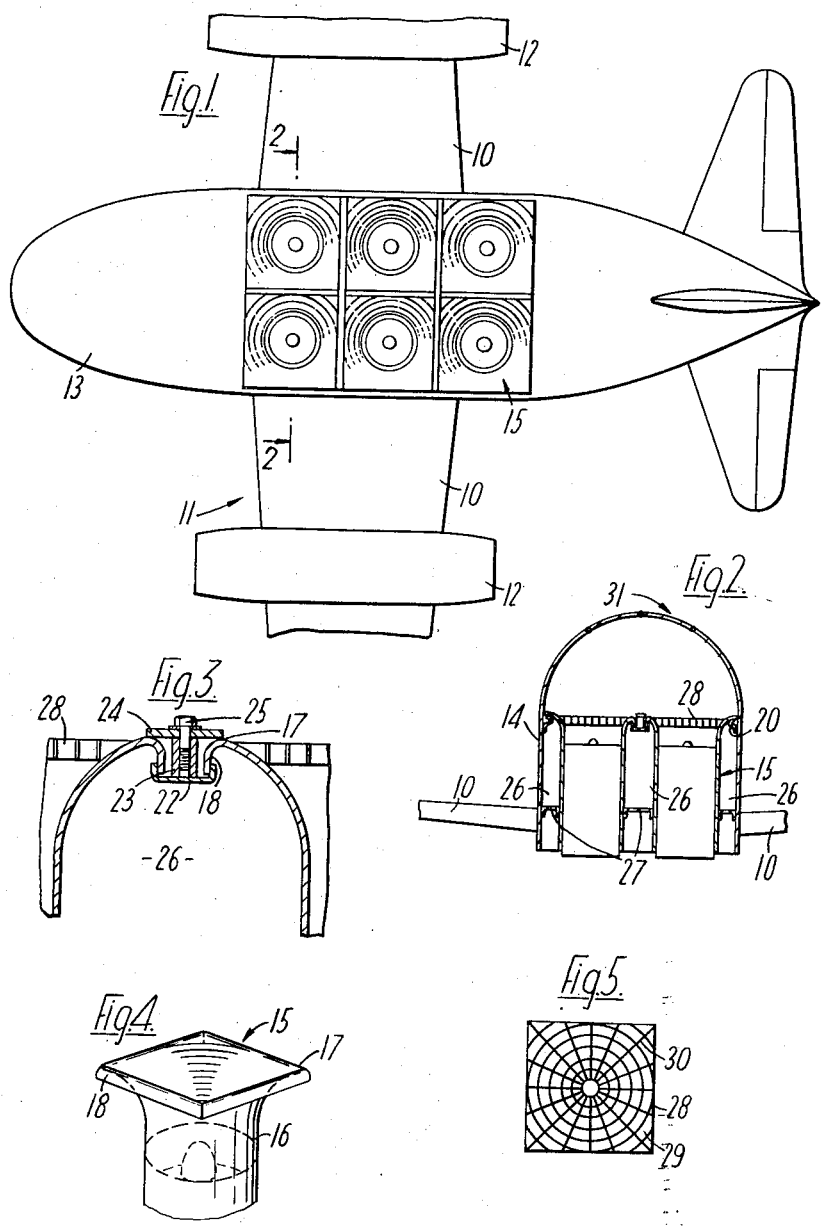

United States Patent Office 3,043,538
Patented July 10, 1962

3,043,538
POWER PLANT FOR USE IN JET SUSTAINED AIRCRAFT
Maurice Ian Taylor, Allestree, England, assignor to Rolls-Royce Limited, Derby, England, a company of Great Britain
Filed Apr. 3, 1961, Ser. No. 100,422
Claims priority, application Great Britain Apr. 11, 1960
8 Claims. (Cl. 244—23)

This invention concerns power plant, e.g. for use in aircraft.

According to one aspect of the present invention there is provided power plant comprising a plurality of jet propulsion engines whose air intakes are secured together in such a way that, between any pair of adjacent engines, there are no cavities which are open to the air intakes of said engines.

The invention has been developed by reason of the fact that if open ended cavities are permitted between the said adjacent engines any debris within the cavities tends to be drawn into the engines.

Preferably the forward end of each of the air intakes has at least one linear side which is disposed alongside that of an adjacent air intake. Thus the forward end of each of the air intakes may have a square cross-section, the engines of the power plant fitting closely against each other.

According to another aspect of the present invention there is provided a jet propulsion engine adapted for use in the said power plant, said engine having an air intake whose forward end has a cross-section such as to permit it to fit closely against the air intakes of similarly formed engines.

Each air intake preferably has a debris guard mounted within it so as to reduce the risk of debris being drawn into the engine.

The invention also comprises an aircraft which is provided with a power plant as set forth above. Thus the engines of said power plant may be arranged on said aircraft as vertical lift engines.

The term "vertical lift engines" as used in this specification is to be understood to mean engines which are arranged on an aircraft so as to develop lift forces independent of those generated aerodynamically by forward flight of the aircraft.

The invention is illustrated, merely by way of example, in the accompanying drawings, in which:

FIGURE 1 is an underneath plan view of an aircraft provided with an engine bay containing vertical lift engines, FIGURE 2 is a broken away section taken on the line 2—2 of FIGURE 1, FIGURE 3 is a broken-away section showing a part of the structure of FIGURE 2 on a larger scale.

FIGURE 4 is a broken away perspective view of one of the engines of said engine bay, and FIGURE 5 is a plan view of a debris guard which is mounted in the forward end of the air intake of each of said engines.

Referring to the drawings, each of the wings 10 of an aircraft 11 is provided with a downwardly extending strut (not shown) at whose lower end is mounted a nacelle 12. Within each nacelle 12 are mounted a pair of forward propulsion, jet reaction, gas turbine engines (not shown) one of which is mounted vertically above the other.

The aircraft 11 has a fuselage 13 which is provided with an engine bay 14 within which are two longitudinally extending rows of gas turbine, jet reaction, vertical lift engines 15, each said row containing three vertical lift engines. Each vertical lift engine 15 has an air intake 16 whose forward end has an outwardly flared lip 17, the lip 17 having a square cross section. The said lip 17 terminates in straight-sided, rearwardly directed flanges 18.

Those flanges 18 which extend longitudinally of the fuselage 13 and which are disposed adjacent to the walls of the engine bay 14 are carried by brackets 20 secured to said walls.

The adjacent flanges 18 of neighbouring engines 15 extend alongside each other and are received within a channel member 22 whose upper side is provided with a nut 23 or the like. A metal strip 24, which bridges the lips 17 of the said neighbouring engines, is secured in position by a bolt 25 which is threaded into the nut 23.

Thus although there are cavities 26 between adjacent engines 15 and between the engines 15 and the walls of the engine bay 14, the upper ends of these cavities are closed by the channel members 22 and strips 24 and by the brackets 20.

When the engines 15 are in use, the suction of the air into the air intakes 16 causes a depression around the latter. This would tend to draw any debris within the cavities 26 into the air intakes 16 were it not that the upper ends of the cavities 26 are closed as explained above.

Each engine 15 is spaced from its adjacent engines and from the adjacent walls of the engine bay 14 by an asbestos or other fire-resistant wall member 27 which constitutes an end wall of the cavities 26. The wall member 27 is disposed between the compressor and the combustion equipment of each engine 15 so that if a fire spreads from any of these combustion equipments it will be hindered or prevented from spreading forwardly thereof.

The pressure beneath the wall member 27 is substantially atmospheric but, if the upper ends of the cavities 26 were open, the pressure in the latter would be sub-atmospheric which would necessitate the provision of a strong wall member 27. A further advantage, therefore, of closing the said upper ends is that this ensures that the pressure within the cavities 26 is also substantially atmospheric whereby it is sufficient to form the wall member 27 of light construction.

Mounted within each of the air intakes 16 is a debris guard 28 consisting of a plurality of concentric annular ribs 29 and a plurality of radial ribs 30. The ribs 29, 30, which serve to prevent any large pieces of debris from entering the air intakes 16, also serve to straighten the flow of air into the air intakes.

We have found that if a blade or other part of the compressor of a gas turbine engine should break off therefrom it is liable to be thrown forwardly out of the engine. Such a blade or other part of the compressor could therefore be sucked into the air intake of an adjacent engine so as to put the latter out of operation. Thus a failure of one of the engines in an engine bay could, just conceivably, spread from one engine to the next. The provision of the engines 15 with debris guards 28, however, prevents any such occurrence.

The upper end of the engine bay 14 is provided with a hood 31 made up of a number of portions which are pivotally connected together. When the hood 31 is disposed as shown in FIGURE 2 the upper end of the engine bay 14 is closed off from the ambient air. When, however, it is desired to bring the engines 15 into operation, the pivoted portions of the hood 31 are moved by links (not shown) to a position in which they are collapsed against each other, whereby the upper end of the engine bay is opened to the ambient air.

I claim:

1. In an aircraft: an engine bay structure, a plurality of jet engines mounted vertically within said engine bay structure for imparting vertical lift to the aircraft, said jet lift engines having spaces therebetween, a hollow air intake casing for each of said jet lift engines, closure means securing said air intake casings to one another and to said engine bay structure, said closure means and said air intake casings and said engine bay structure cooperating to close said spaces to vertical airflow from forward of said air intake casings.

2. An aircraft as claimed in claim 1 including a debris guard mounted across the forward end of each of said air intake casings.

3. An aircraft as claimed in claim 1 wherein said closure means is positioned to secure the forward ends of said air intake casings.

4. In an aircraft: an engine bay structure, a plurality of jet lift engines mounted vertically within said engine bay structure for imparting vertical lift to the aircraft, said jet lift engines having spaces therebetween, a hollow air intake casing for each of said jet lift engines, the forward ends of said air intake casings having linear sides which are disposed alongside of one another and said engine bay structure, closure means securing the linear sides of said air intake casings to one another and to said engine bay structure, said closure means and said air intake casings and said structure cooperating to close said spaces to vertical airflow from forward of said air intake casings.

5. An aircraft as claimed in claim 4 wherein said linear sides of said air intake casings define a substantially square cross-sectional shape for the forward ends of the same.

6. In an aircraft: an engine bay structure, a plurality of jet lift engines mounted vertically within said structure for imparting vertical lift to the aircraft, said jet lift engines having spaces therebetween, a hollow air intake casing for each engine, said air intake casing having a forward end with linear sides defining a substantial cross-sectional shape, each of the linear sides of each air intake casing having a downwardly directed flange, closure means securing the forward linear sides of said air intake casings to one another and to said engine bay structure, said closure means comprising at least one channel member cooperating with adjacent flanges of adjacent engines and at least one plate member adjustably secured to said channel member and bridging corresponding lips of adjacent linear sides, said closure means and said air intake casing and said engine bay structure cooperating to close said spaces to vertical air flow from forward of said air intake casings.

7. An aircraft as claimed in claim 6 including a wall structure positioned between each of said engines and said engine bay structure, said wall structure defining an end wall for said spaces.

8. An aircraft as claimed in claim 6 wherein said closure means further includes brackets secured to said engine bay structure and cooperating with linear sides of said air intake casings disposed adjacent said engine bay structure.

References Cited in the file of this patent

UNITED STATES PATENTS

| | | |
|---|---|---|
| 2,526,941 | Fishbein | Oct. 24, 1950 |
| 2,704,136 | Rainbow | Mar. 15, 1955 |
| 2,782,593 | Lee | Feb. 26, 1957 |
| 2,840,322 | Griffith | June 24, 1958 |
| 2,936,969 | Griffith | May 17, 1960 |

FOREIGN PATENTS

| | | |
|---|---|---|
| 578,837 | Great Britain | July 15, 1946 |
| 817,507 | Great Britain | July 29, 1959 |